United States Patent [19]

Futakata

[11] Patent Number: 4,852,676

[45] Date of Patent: Aug. 1, 1989

[54] ELECTRONIC WEIGHING MACHINE

[75] Inventor: Takashi Futakata, Shizuoka, Japan

[73] Assignee: Tokyo Electric Company, Ltd., Tokyo, Japan

[21] Appl. No.: 221,552

[22] Filed: Jul. 20, 1988

[30] Foreign Application Priority Data

Jul. 21, 1987 [JP] Japan .................. 62-181996

[51] Int. Cl.⁴ .................. G01G 23/00; G01G 23/22; G01G 23/32
[52] U.S. Cl. .................. 177/245; 177/25.15; 177/178
[58] Field of Search .................. 177/25.15, 177, 178, 177/245

[56] References Cited

U.S. PATENT DOCUMENTS 4,577,710 3/1986 Ruzumna .................. 177/245
4,700,792 10/1987 Tajima et al. .................. 177/178

Primary Examiner—George H. Miller, Jr.
Attorney, Agent, or Firm—Oblon, Spivak, McClelland, Maier & Neustadt

[57] ABSTRACT

Disclosed is here an electronic weighing machine in which the price is calculated from a unit price set thereto and the weight of the item loaded on a tray so as to display the unit price, weight, and price on the display in a digitalized form and to display the item name on the item name display. Various messages for the sales promotion are stored in a memory such that messages are combined to display a combined message, thereby displaying various messages with a small memory capacity.

5 Claims, 7 Drawing Sheets

MESSAGE 1

| THANK YOU CALL AGAIN |

MESSAGE 2

| EVERY WEDENESDAY IS SERVICED |

MESSAGE 3

| CALIFORNIA ORANGE |

ELECTRONIC WEIGHING MACHINE

FIELD OF THE INVENTION AND RELATED ART STATEMENT

The present invention relates to an electronic weighing machine which is provided with, in addition to a data display for displaying data including numeric digits and symbols of the weight, price, and the like, a message display for displaying a message including an item name and the like.

Conventionally, in an electronic weighing machine having a display, there is disposed a memory in which predetermined messages are stored such that in a case where a message display is required, the content of the memory is displayed. In some cases, there are disposed a plurality of memories for the messages; however, when displaying a message in the display, the content of the memory is individually displayed.

OBJECTS AND SUMMARY OF THE INVENTION

It is therefore a first object of the present invention to enable a great number of messages to be displayed with a small capacity of memory storing the contents to be displayed.

A second object of the present invention is to enable a message to be displayed when a weighing operation is not being executed so as to improve the efficient utilization of the display.

A third object of the present invention is to enable the content exceeding the maximum display capacity of the display to be displayed.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
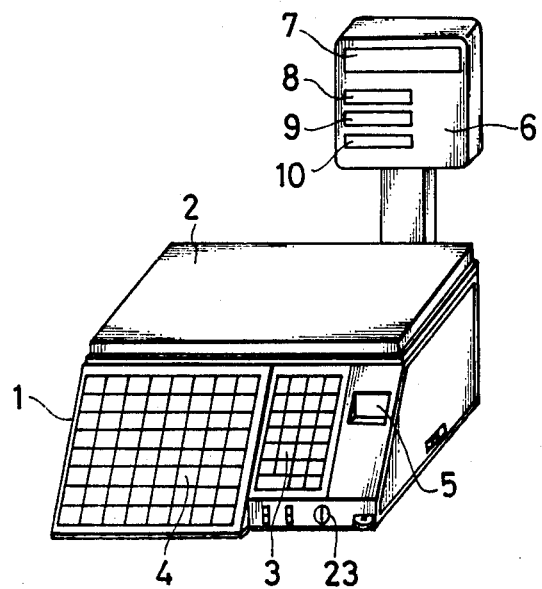
FIG. 1 is an overall perspective view of an electronic weighing machine showing a first embodiment according to the present invention.

Referring now to FIGS. 1 to 7, description will be given of the first embodiment according to the present invention. As shown in FIG. 1, an electronic weighing machine 1 includes a tray 2 on which an item is loaded for a measurement of the weight thereof, and a panel key 3, a direct key 4, and other keys are disposed on a front panel of the electronic weighing machine 1; furthermore, a label eject slot 5 is disposed on a side thereof. In addition, on a rear side of the wall on the right-hand side of the electronic weighing machine 1, there is disposed a display 6 projecting upward therefrom. The display 6 is provided with an item name display 7 as a message display in the upper-most line. In the lower lines thereof, there are sequentially disposed a weight display section 8, a unit price display section 9, and a price display section 10 each displaying numeric digits in a seven-segment display system.

In addition, on the front side of the electronic weighing machine 1, there is disposed a lock key switch 23 to be operated by a supervisor to set various codes with a key.

Figure 2:
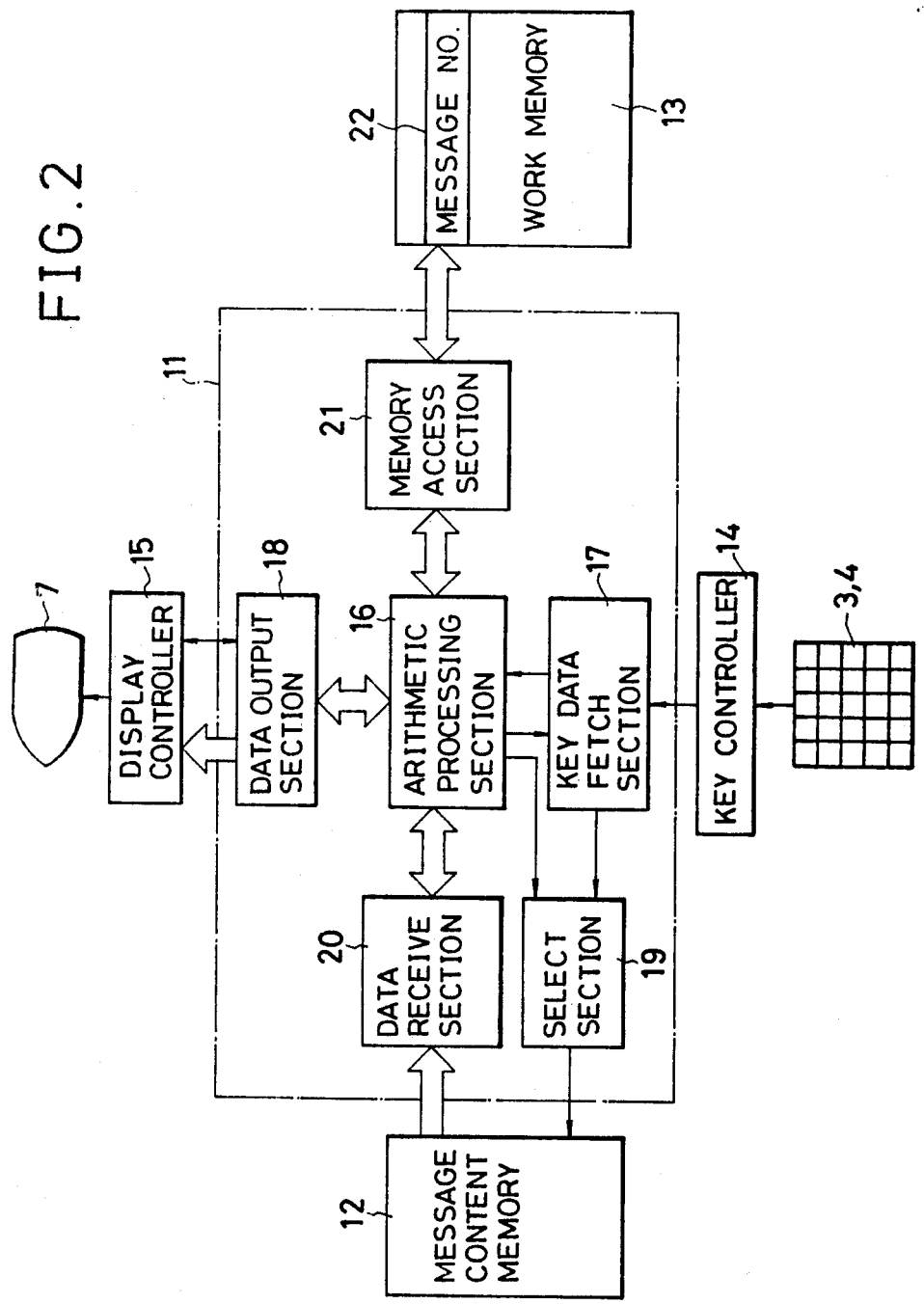
FIG. 2 is a block diagram schematically showing the electronic weighing machine of FIG. 1.

Next, referring to FIG. 2, the constitution of the electric control system will be described. This configuration includes a main CPU 11 to which a message content memory 12 and a work memory 13 are connected. Moreover, the panel key 3 and the direct key 4 are connected via a key controller 14 to the main CPU 11. On the other hand, the item name display 7 is connected thereto via display controller 15. It is here assumed that the main CPU 11 mainly includes an arithmetic processing section 16 editing display message data by use of a message number memory 22 and further comprises a key data fetch section 17 obtaining a key input via the key controller 14 and a data output section 18 for the display controller 15 side. In addition, for the content memory 12, there are disposed a selecting section 19 to search for the pertinent message content data and a data receive section 20 to receive data from the message content memory 12. On the other hand, a memory access section 21 is disposed for the work memory 13.

In this constitution, the weight measuring operation is ordinarily effected by loading an item of which the weight is to be measured on the tray 2. In this situation, a price lookup memory (PLU) beforehand prepared is accessed. As a result, unit prices, item names, and the like set in the PLU are displayed on the unit price display 9 and the item name display 7. Thereafter, the weight measurement is effected and then the resultant weight of the item and the price calculated based on the weight of the item are displayed on the unit price display 9 and the item name display 7.

The weight measuring operation is achieved as described above in an ordinary case. At a time when the weight measurement is not being effected, for example, when the tray 2 is not loaded with an item, the item display 7 is utilized as a message display so as to display a message through the following procedure.

Figure 3:
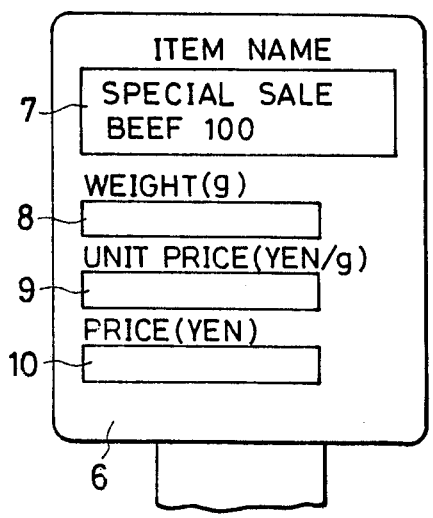
FIG. 3 is a flowchart showing an outline of the operation of the electronic weighing machine.

Incidentally, the message content memory 12 is beforehand loaded with messages or contents and functions as a message data store section and as a content data store section. The operation of the message content memory 12 will be briefly described. As shown in FIG. 3, the contents stored in the message data store section and the content data store section are accessed by use of a message number 22 selected from the panel key 3 so as to be edited in the display message data edit section as message combine means, thereby automatically displaying the message or displaying a combined message depending on an input of a message display key from the panel key 3.

Figure 4:
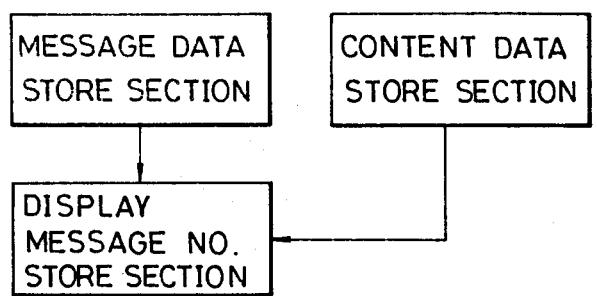
FIG. 4 is a front view of a display of the electronic weighing machine.

For example, a message "Bargain Sale Today" of FIG. 4 is configured by combining a message "Today" with a message "Bargain Sale".

Figure 5:
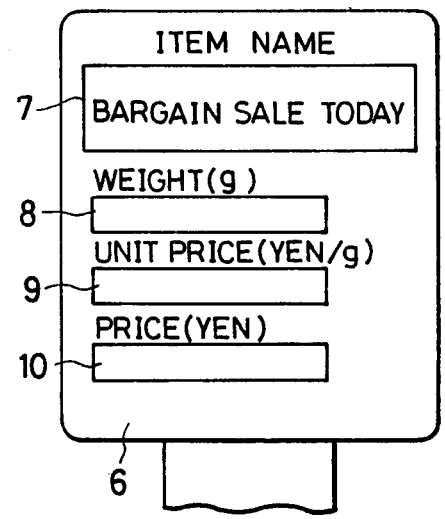
FIG. 5 is a front view of a display indicating contents other than those displayed in the state of FIG. 4.

In addition, a message "Special Sale Beef 100" displayed in FIG. 5 is obtained by combining a message "Special Sale", a message "Beef", and a data item "100".

Figure 6:
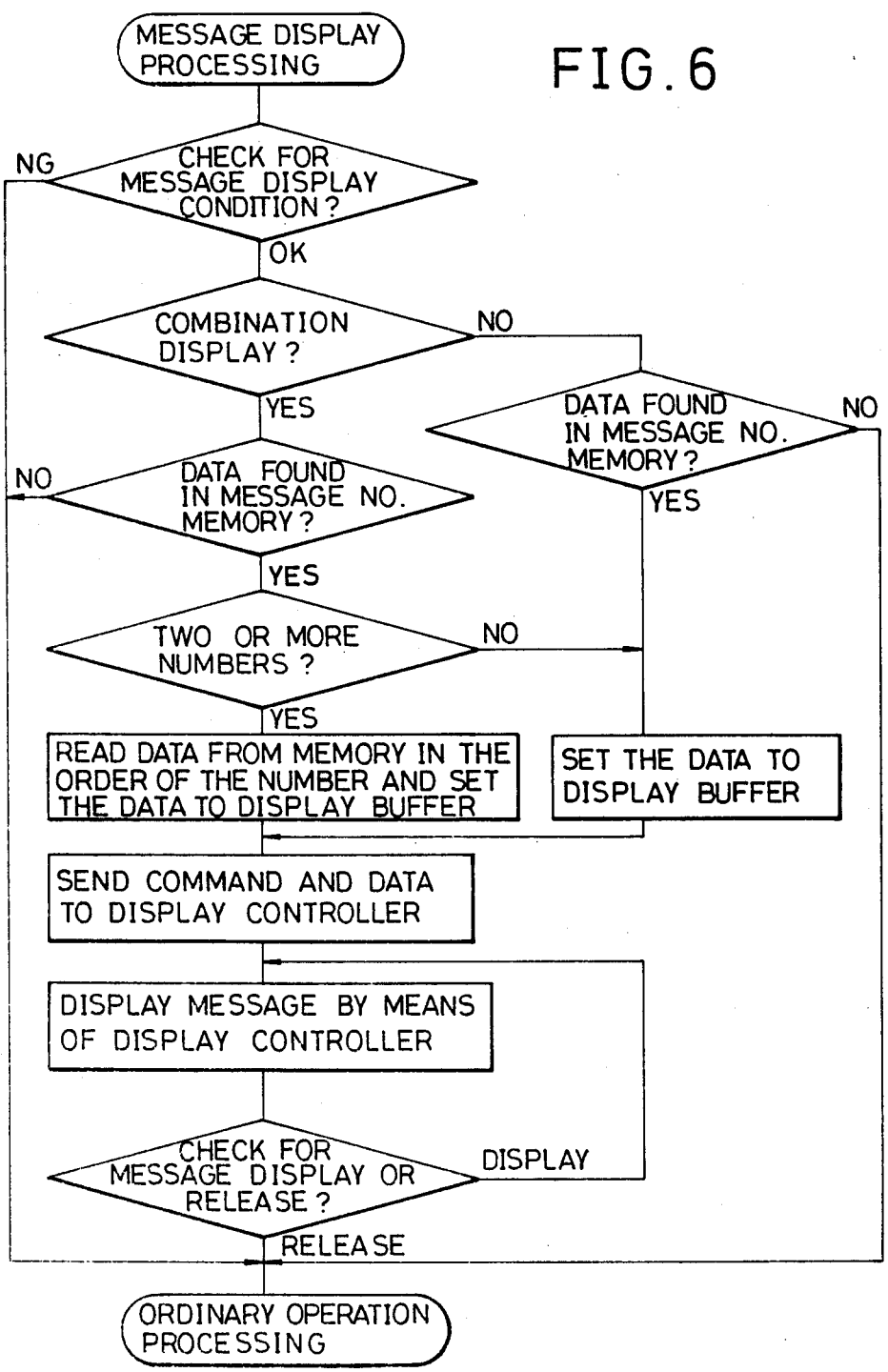
FIG. 6 is a flowchart showing the message display processing.

Referring now to FIG. 6, description will be given of the operation of message display processing. First, the message display condition is checked. If a combination display has been specified, it is confirmed that the data exists in the memory area of the message number. If there exist two or more message numbers 22, the data items are accessed in the order of the message number so as to be set to the display buffer (in the work memory 13). Thereafter, a command and data are transmitted to the display controller 15, which then displays the message. When a release of the message display is instructed, the displayed message is released.

In a case of other than the combination display, it is confirmed that data exists in the memory of the message number 22 so as to set the pertinent data to the display buffer for the display thereof.

Figure 7:
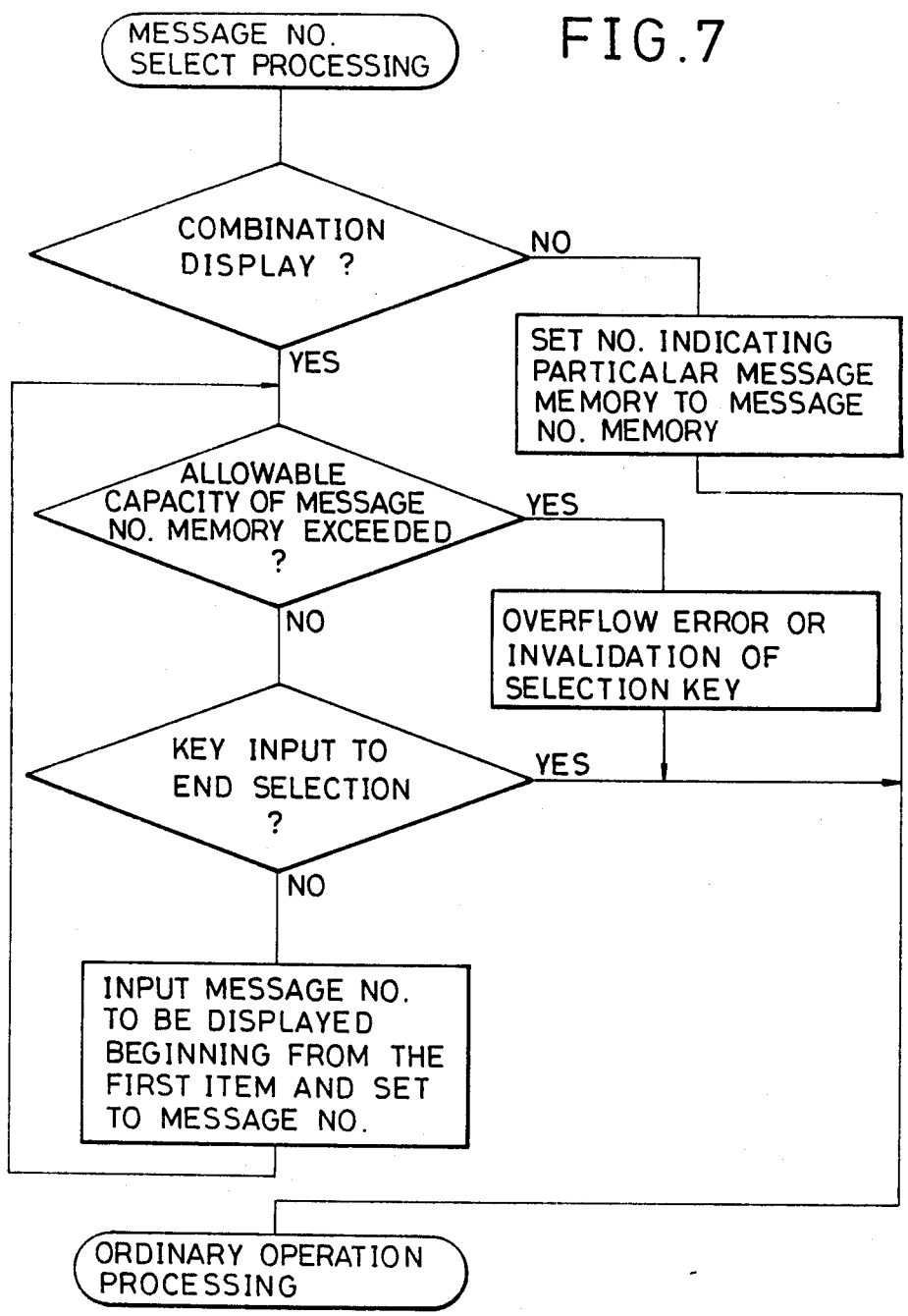
FIG. 7 is a flowchart showing the selection processing.

Referring next to FIG. 7, message number select processing will be described. For a combination display, it is checked whether or not the capacity of the message number 22 memory is exceeded. If this is not the case, a message number is loaded in the message number field 22 beginning from the first item. This setting operation is repeatedly achieved until a key input indicating a selection end is received. Naturally, if the message number 22 exceeds the capacity, the overflow error is displayed or the selection key is invalidated.

Figures 10, 11:
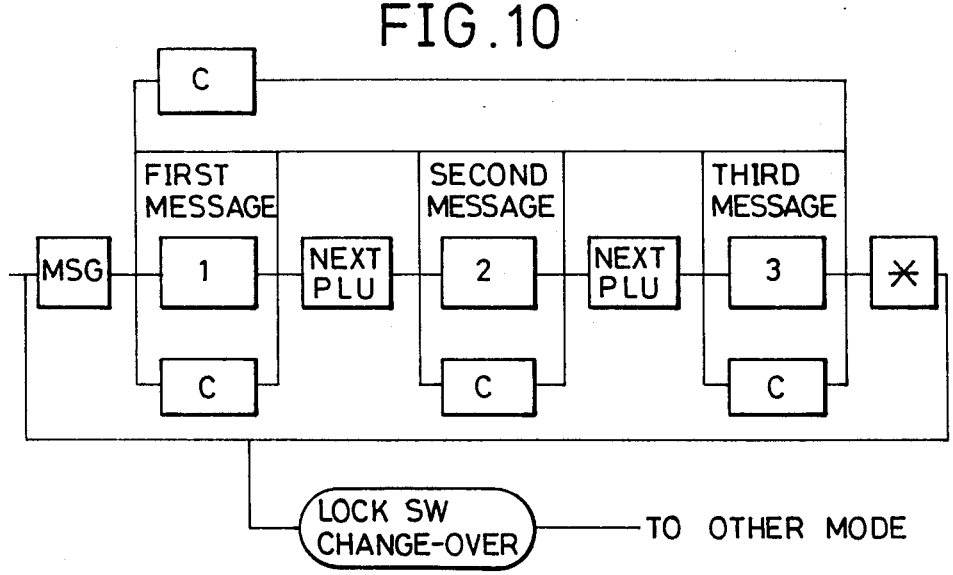
FIG. 10 is a flowchart showing the procedure to combine messages of FIG. 9.
FIG. 11 is a front view showing changes in contents scrolled in the display.

Next, referring to FIGS. 8 to 11, description will be given of the second embodiment according to the present invention. This embodiment is associated with a case where, for example, a long message "THANK YOU CALL AGAIN EVERY WEDNESDAY IS SERVICED CALIFORNIA ORANGE", as shown in FIG. 11, is subjected to a scroll display in which this message is continuously moved from the right to the left on the item name display. In this case, three messages "THANK YOU CALL AGAIN", "EVERY WEDNESDAY IS SERVICED", and "CALIFORNIA ORANGE" are individually stored in advance and are combined for the message display.

Figures 8, 9:
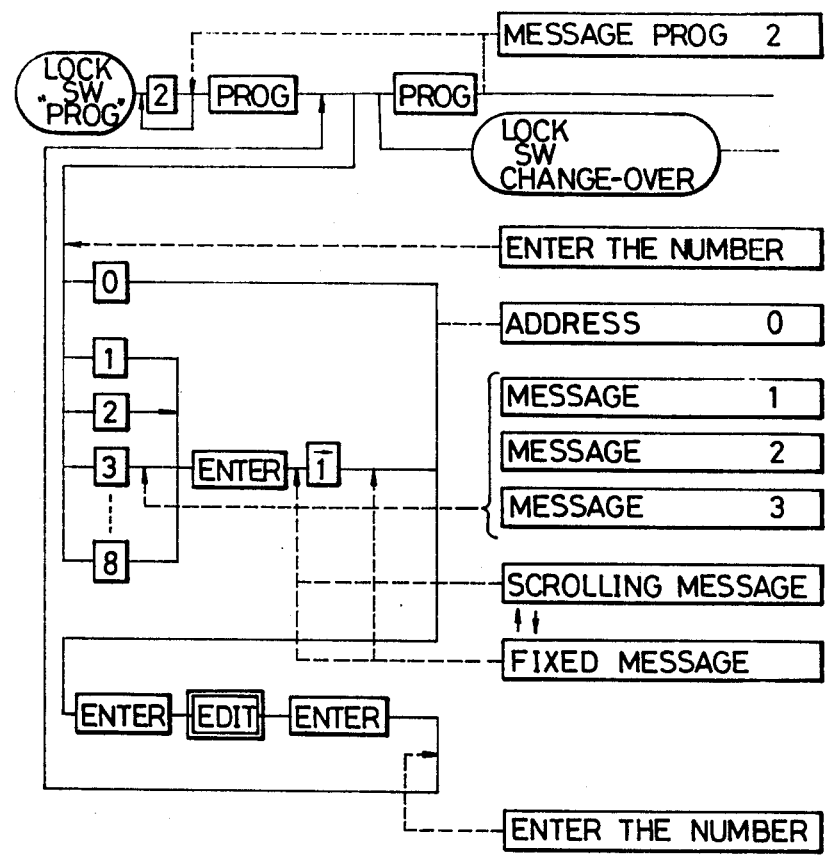
FIG. 8 is a flowchart showing the procedure to set a message in a second embodiment according to the present invention.
FIG. 9 is an explanatory diagram useful to explain the contents of the memory containing three kinds of message contents.

Incidentally, FIG. 8 shows the procedure to set a message. First, the lock key switch 23 is turned to the "PROG" position and then a numeric key "2" is depressed in the panel key 3. The numeric key "2" is assumed to indicate a mode of "message setting" in the program in advance. In this state, when the "Set" key is depressed, a mode specified by a message number ranging from 0 to 8 is established. Numeric key "0" is used to set an address, whereas numeric keys "1" to "9" are disposed to establish messages.

Assume here an address is to be set. For example, there are established correspondences in advance between letters and 3-digit numbers like "001" to "A", "002" to "B", and so on such that a required address can be inputted by entering the respective codes from the corresponding numeric keys. When the ENTER, EDIT, and ENTER keys are thereafter depressed, the address setting operation is finished. Furthermore, when the PROG key is pressed or the lock key switch 23 is depressed, control is released from the setting mode.

When one of the numeric keys "0" to "8" is pressed, the system enters a state in which a message associated with the number is to be inputted. For example, if "1" is depressed, a message "THANK YOU CALL AGAIN" is inputted; for "2", "EVERY WEDNESDAY IS SERVICED" is inputted; and for an input of "3", "CALIFORNIA ORANGE" is inputted. When the ENTER key is pressed thereafter, the system is set to a mode to select a display method, namely, whether the display is fixed or a scroll display is to be achieved. When this operation is finished, the End key is pressed and then the ENTER, EDIT, and ENTER keys are sequentially depressed so as to complete the message setting operation. Moreover, when the PROG key is pressed or the lock key switch 23 is depressed, the setting mode is released.

The procedure of FIG. 10 is employed in order to define a message to be displayed after the messages are set as described above. That is, after a message key is depressed, a numeric key specifying a message number is pressed and then the PLU key is depressed. The operation of the numeric key and the PLU key are repeated as many times as necessary, and then the EXECUTE key is pressed, thereby completing the setting of the display content. For example, if the message setting is established so as to sequentially display the messages 1, 2, and 3, the message display is effected in the state of FIG. 11 as described above.

What is claimed is:

1. An electronic weighing machine, comprising:
   a weighing section for measuring a weight of an item;
   a plurality of memories each for storing a single message;
   message combination means for combining messages stored in said memories;
   a display buffer for storing a combined message;
   display means having a weight display section, a price display section, and an item name display section for displaying a message; and
   key input means for inputting various operation instructions.

2. An electronic weighing machine in according with claim 1, wherein:
   a message display is achieved at a time other than during a weight measuring operation.

3. An electronic weighing machine in accordance with claim 1, wherein:
   a message of which a length is greater than a display capacity of said item name display is subjected to a scroll display according to an order of messages included in said message.

4. An electronic weighing machine, comprising:
   a weighing section for measuring a weight of an item;
   a plurality of memories, each of said plurality of memories storing a single message;
   message combination means for combining messages stored in said plurality of memories and for selecting a sequence for said messages;
   a display buffer for storing a combined message;
   display means for displaying said messages according to the sequence selected by said message combination means; and
   key input means for inputting various operation instructions.

5. An electronic weighing machine according to claim 4, wherein:
   said display means includes an item name display section.

* * * * *